United States Patent
Kern et al.

(10) Patent No.: US 9,834,440 B2
(45) Date of Patent: Dec. 5, 2017

(54) PARALLEL PREPARATION OF HYDROGEN, CARBON MONOXIDE AND A CARBON-COMPRISING PRODUCT

(71) Applicant: BASF SE, Ludwigshafen (DE)

(72) Inventors: Matthias Kern, Deidesheim (DE); Friedrich Glenk, Mannheim (DE); Dirk Klingler, Mannheim (DE); Andreas Bode, Mannheim (DE); Grigorios Kolios, Neustadt (DE); Stephan Schunk, Heidelberg (DE); Guido Wasserschaff, Neckargemuend (DE); Jens Bernnat, Gruenstadt (DE); Bernd Zoels, Obrigheim (DE); Sabine Schmidt, Darmstadt (DE); Rene Koenig, Neustadt (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 14/652,346

(22) PCT Filed: Dec. 17, 2013

(86) PCT No.: PCT/IB2013/061032
§ 371 (c)(1),
(2) Date: Jun. 15, 2015

(87) PCT Pub. No.: WO2014/097142
PCT Pub. Date: Jun. 26, 2014

(65) Prior Publication Data
US 2015/0336795 A1    Nov. 26, 2015

(30) Foreign Application Priority Data
Dec. 21, 2012 (EP) .................................... 12199043

(51) Int. Cl.
*C01B 3/24* (2006.01)
*C01B 31/00* (2006.01)
(Continued)

(52) U.S. Cl.
CPC .................. *C01B 3/24* (2013.01); *C01B 3/38* (2013.01); *C01B 31/18* (2013.01); *C10J 3/06* (2013.01);
(Continued)

(58) Field of Classification Search
CPC ............ C01B 31/18; C01B 2203/0238; C01B 2203/0272; C01B 3/24; C01B 3/38;
(Continued)

(56) References Cited

U.S. PATENT DOCUMENTS 3,919,114 A    11/1975  Reynolds
5,496,530 A    3/1996   Vannby et al.
(Continued)

FOREIGN PATENT DOCUMENTS

CN    101249949 A    8/2008
DK    EP 0601956 A2 * 6/1994 ............. C01B 31/18
(Continued)

OTHER PUBLICATIONS

International Search Report issued May 8, 2014 in PCT/IB2013/061032.
(Continued)

*Primary Examiner* — Anthony J Zimmer
*Assistant Examiner* — Syed Iqbal
(74) *Attorney, Agent, or Firm* — Oblon, McClelland, Maier & Neustadt, L.L.P.

(57) ABSTRACT

The invention relates to a process for the parallel preparation of hydrogen, carbon monoxide and a carbon-comprising product, wherein one or more hydrocarbons are thermally decomposed and at least part of the pyrolysis gas formed is (Continued)

taken off from the reaction zone of the decomposition reactor at a temperature of from 800 to 1400° C. and reacted with carbon dioxide to form a gas mixture comprising carbon monoxide and hydrogen (synthesis gas).

12 Claims, 5 Drawing Sheets

(51) Int. Cl.
*C01B 31/18* (2006.01)
*C01B 3/38* (2006.01)
*C10K 3/02* (2006.01)
*C10J 3/06* (2006.01)

(52) U.S. Cl.
CPC ...... *C10K 3/026* (2013.01); *C01B 2203/0238* (2013.01); *C01B 2203/0272* (2013.01); *C01B 2203/0283* (2013.01); *C01B 2203/1235* (2013.01); *Y02P 20/129* (2015.11); *Y02P 20/146* (2015.11)

(58) Field of Classification Search
CPC ..... C01B 2203/1235; C01B 2203/0283; Y02P 20/146; Y02P 20/129; C10J 3/06; C10K 3/026
IPC .................................................. Y02P 20/129
See application file for complete search history.

(56) References Cited

U.S. PATENT DOCUMENTS

| | | | |
|---|---|---|---|
| 6,749,829 B2* | 6/2004 | Briscoe | C01B 3/323 252/373 |
| 2009/0203519 A1 | 8/2009 | Abatzoglou et al. | |
| 2011/0089378 A1 | 4/2011 | Sato et al. | |
| 2011/0301386 A1 | 12/2011 | Mamedov et al. | |
| 2014/0127121 A1 | 5/2014 | Maass et al. | |
| 2014/0217327 A1 | 8/2014 | Maass et al. | |

FOREIGN PATENT DOCUMENTS

| | | |
|---|---|---|
| EP | 0 601 956 A2 | 6/1994 |
| WO | WO 2010/069549 A1 | 6/2010 |
| WO | WO 2013/004398 A2 | 1/2013 |

OTHER PUBLICATIONS

U.S. Appl. No. 14/651,862, filed Jun. 12, 2015, Machhammer, et al.
U.S. Appl. No. 14/653,482, filed Jun. 18, 2015, Schneider, et al.
International Search Report and Written Opinion issued May 8, 2014 in PCT/IB2013/061032.
Luhui Wang, et al., "Reverse water gas shift reaction over Co-precipitated Ni—$CeO_2$ catalysts", Journal of Rare Earths, 2008, vol. 26, pp. 66-70.
Gregory S. Yablonsky, et al., "Cycles Across an Equilibrium: A Kinetic Investigation of the Reverse and Forward WGS Reaction over a 2% Pt/$CeO_2$ Catalyst (Experimental Data and Qualitative Interpretation)", Chemical Engineering Science, 2010, vol. 65, pp. 2325-2332.
Andreas Jess, et al., "Considerations concerning the Energy Demand and Energy Mix for Global Welfare and Stable Ecosystems", Chemie Ingenieur Technik, 2011, vol. 83, pp. 1777-1791.
Gerhard Kreysa, "Methan-Chance für eine klimaverträgliche Energie-versorung", Chemie ingenieur Technick CIT, 2008, vol. 80, No. 7, pp. 901-908.
Hazzim F. Abbas, et al., "Hydrogen production by methane decomposition: A review", International Journal of Hydrogen Energy, 2010, vol. 35, pp. 1160-1190.
Nieken, "Abluftreinigung in Reaktoren mit periodischer Strömungsumkehr", VDI-Reihe, 1993, vol. 3, Issue 328, 17 pages.
Kolios, "Zur autothermen Führung der Styrolsynthese mit periodischem Wechsel der Strömungsrichtung", VDI-Fortschrittsberichte, 1997, vol. 501, Issue 3, 3 pages.
Reimert et al., "Gas Production, 2. Process", Ullmann's Encyclopedia of Industrial Chemistry, 2012, vol. 16, 61 Pages.
Office Action dated Sep. 5, 2017, in Taiwanese Patent Application No. 102147076 (with partial English translation).

* cited by examiner

Figure 4

| $H_2/CO_2$ ratio | 3 | 2 | | 3 | 2 | | 3 | 2 | | 3 | 2 |
|---|---|---|---|---|---|---|---|---|---|---|---|
| Temp. [°C] | 750 | 750 | | 850 | 850 | | 900 | 900 | | 950 | 950 |
| Product [vol%] | | | | Product [vol%] | | | Product [vol%] | | | Product [vol%] | |
| $H_2$ | 44.2 | 36.0 | | 52.2 | 41.8 | | 53.8 | 42.2 | | 54.3 | 42.3 |
| CO | 11.8 | 15.9 | | 17.3 | 21.5 | | 18.8 | 22.9 | | 19.7 | 23.9 |
| $CO_2$ | 9.4 | 15.6 | | 6.6 | 11.4 | | 5.7 | 10.2 | | 5.1 | 9.4 |
| H2O | 27 | 27 | | 21.7 | 24 | | 20.7 | 23.9 | | 20.5 | 24.3 |
| $CH_4$ | 7.6 | 5.6 | | 2.2 | 1.3 | | 1 | 0.5 | | 0.4 | 0.2 |
| | | | | | | | | | | | |
| H2/CO | 3.75 | 2.26 | | 3.02 | 1.94 | | 2.86 | 1.85 | | 2.76 | 1.77 |
| $(H_2-CO_2)/(CO+CO_2)$ | 1.64 | 0.65 | | 1.91 | 0.92 | | 1.96 | 0.97 | | 1.98 | 0.99 |

1st half cycle

2nd half cycle

PARALLEL PREPARATION OF HYDROGEN, CARBON MONOXIDE AND A CARBON-COMPRISING PRODUCT

CROSS-REFERENCE TO RELATED APPLICATIONS

This application is a National Stage of PCT/IB2013/061032 filed on Dec. 17, 2013. This application is based upon and claims the benefit of priority to European Application No. 12199043.6 filed on Dec. 21, 2012.

BACKGROUND OF THE INVENTION

The invention relates to a process for the parallel preparation of hydrogen, carbon monoxide and a carbon-comprising product, wherein one or more hydrocarbons are thermally decomposed and at least part of the hydrogen-comprising gas mixture formed is taken off from the reaction zone of the decomposition reactor at a temperature of from 800 to 1400° C. and reacted with carbon dioxide to form a gas mixture comprising carbon monoxide and hydrogen (synthesis gas).

$CO_2$ emissions in Germany were about 960 million metric tons of $CO_2$ equivalent in 2010, to which the chemical industry contributes about 5%. From ecological and economic points of view, there are big incentives in the chemical sector to reduce $CO_2$ emissions by alteration of the raw materials basis, low-$CO_2$ production technologies, optimization of energy consumption and utilization of process-related $CO_2$ to produce large-volume basic chemicals. Suitable basic chemicals are, for example, hydrogen and synthesis gas. The latter forms the ideal interface to existing petrochemical processes for the production of, for example, methanol, dimethyl ether or Fischer-Tropsch products. The worldwide demands for hydrogen and synthesis gas are at present 50 million metric t/a and 220 million metric t/a, respectively.

Steam reforming is at present the most widespread process for producing synthesis gas having a hydrogen to carbon monoxide ratio of from 2.5 to 3.0 from light hydrocarbons. The proportion of hydrogen can be increased still further at the expense of the carbon monoxide content by means of the additional complication of carrying out a shift stage. The feedstocks natural gas, liquefied gas or naphtha are endothermically reacted with steam in catalytic tube reactors to give synthesis gas having a high hydrogen content. Process heat and flue gas heat are utilized for steam generation.

The preparation of synthesis gas having a hydrogen to carbon monoxide ratio of from 1.0 to 2.0 by steam reforming is problematical. This ratio of $H_2$/CO is of great importance for downstream utilization in the field of fuels and chemicals and is a particular challenge for steam reforming since this requires catalysts which have particular stability against carbonization. Alternative processes for preparing synthesis gas having an $H_2$/CO ratio of from 1.0 to 2.0 are autothermal reforming of natural gas and partial oxidation. Both processes are employed industrially, but require the use of pure oxygen which is obtained by fractionation of air. For example, the partial oxidation of natural gas in the feed requires a theoretical molar $O_2$:$CH_4$ ratio=1:2. The highly energy-consuming cryogenic fractionation of air is therefore a considerable cost driver for the latter two processes.

Important consumers of synthesis gas are, inter alia, the synthesis of methanol (hydrogen to carbon monoxide ratio of 2:1), the oxo process for preparing alcohols and aldehydes from olefins (hydrogen to carbon monoxide ratio of 1:1) and the Fischer-Tropsch synthesis to produce alkanes (hydrogen to carbon monoxide ratio of 2:1) or the Fischer-Tropsch synthesis to produce olefins (hydrogen to carbon monoxide ratio of 1:1).

In addition, synthesis gas serves as hydrogen source for the synthesis of ammonia. Here, a hydrogen-rich synthesis gas from steam reforming (hydrogen to carbon monoxide ratio of 3:1) is enriched further in hydrogen in a water gas shift reaction stage. Here, CO is converted into $CO_2$ which is subsequently separated off. Pure hydrogen is obtained in this way.

A further disadvantage of catalytic steam reforming is the susceptibility to catalyst poisons such as sulfur. To protect the catalyst from these, the feed gas has to be purified in a complicated manner in preceding process stages. Organic sulfur compounds, for example mercaptans or thiophenes are hydrogenated beforehand over Co—Mo or Ni—Mo catalysts to form hydrogen sulfide. Hydrogen sulfide is, for example, reacted over ZnO which is converted into ZnS as a result and has to be replaced regularly. Furthermore, heat integration of steam reforming is incomplete, and only about 50% of the heat produced is utilized effectively for the reaction. Furthermore, the synthesis gas produced in this way has a quite high $CO_2$ footprint of about 40 $kg_{CO_2}$/100 $kg_{synthesis\ gas}$.

The reforming of methane and carbon dioxide, an alternative way of preparing synthesis gas, is of great economic interest since this process offers the opportunity of preparing synthesis gas as important basic chemical utilizing carbon dioxide as starting material. Accordingly, carbon dioxide which is obtained as waste product in numerous processes could be bound by means of a chemical route. This offers the possibility of reducing carbon dioxide emissions into the atmosphere. Here too, catalyst development is a particular challenge since catalysts which have particular stability against carbonization are likewise required here.

Such processes are known, for example, from the patent applications US 2009/203519 and US 2011/089378. Both patent applications describe processes in which methane and carbon dioxide are passed over a catalyst and reacted by dry reforming. Owing to the Boudouard equilibrium and the thermal decomposition of methane, carbon is formed and deposits, inter alia, on the catalyst and poisons the latter, so that the catalyst has to be replaced or regenerated at regular intervals.

A further alternative way of preparing synthesis gas using carbon dioxide as starting material is the reverse water gas shift (RWGS) reaction. Activation of $CO_2$ by means of hydrogen via the RWGS reaction leads to carbon monoxide and water and is endothermic with an enthalpy of reaction of 41 kJ/mol under standard conditions. According to the thermodynamic equilibrium, temperatures of greater than 500° C. are necessary for substantial CO formation since methanation otherwise occurs preferentially at temperatures below 500° C. Only laboratory studies are known for the reaction (Luhui, W.; Shaoxing, Z.; Yuan, L.: Reverse water gas shift reaction over co-precipitated Ni—CeO2 catalysts. Journal of Rare Earths 2008, 26, 66-70; Yablonsky, G. S.; Pilasombat, R.; Breen, J. P.; Bruch, R.; Hengrasmee, S.: Cycles Across an Equilibrium: A Kinetic Investigation of the Reverse and Forward WGS Reaction over a 2% Pt/CeO2 Catalyst (Experimental Data and Qualitative Interpretation). Chem. Eng. Sci. 2010, 65, 2325-2332; Jess, A.; Kaiser, P.; Kern, C.; Unde, R. B.; Olshausen, C.: Considerations concerning the Energy Demand and Energy Mix for Global Welfare and Stable Ecosystems. Chemie Ingenieur Technik 2011, 83, 1777-1791).

Industrially, the RWGS reaction has hitherto not been carried out since no inexpensive hydrogen source which has a small or acceptable $CO_2$ footprint and could allow the RWGS reaction to be carried out economically at high temperatures has been available up to the present day.

Competitive processes for preparing hydrogen are still steam reforming processes. Although these processes have an inherent price advantage which is reflected in the hydrogen price, hydrogen production is coupled with a high emission of carbon dioxide. For this reason, it is not feasible for technical and economic reasons to use the hydrogen produced in steam reforming for the hydrogenation of carbon dioxide in a further endothermic process step. Alternative hydrogen sources based on renewable raw materials can overcome the coupling of production to carbon dioxide from hydrogen production, but it has to be taken into account here that the high temperature level of the RWGS reaction required for synthesis gas production still requires a high energy input.

Although high-temperature RWGS reactions would be effective for achieving a high conversion of carbon dioxide and advantageous for suppressing methanation and carbon formation as undesirable secondary reactions, this has not been studied to any great extent in the past. Carrying out the reaction at this high temperature level requires a very high engineering outlay for heat input or energetically favorable coupling with a high-temperature source. According to the present-day prior art, only furnaces comparable to steam reformers come into question for this high-temperature energy input. However, in these processes only about 50% of the quantity of heat generated can be taken up by the endothermic reaction. The excess heat thus has to be removed in a complicated network of heat exchangers and recirculated in the process, for example for preheating the feed streams.

There are indications in the literature, e.g. Kreysa, CIT 80 (2008), 901-908, that hydrogen can be produced with a small $CO_2$ footprint by means of thermal decomposition (pyrolysis) of hydrocarbons in a fluidized bed composed of carbon-comprising granules. The countercurrent transport of the gaseous reaction mixture and the carbon-comprising granules gives a process having integrated heat recirculation. However, an efficiency of the heat integration, defined as ratio of the heat consumed by the endothermic reaction to the heat introduced of at best 83% can be achieved by means of this process. The reason for this is the ratio of the heat capacities of the starting materials and of the products of pyrolysis: for example, the average specific heat capacity of the methane used in the range from 100° C. to 1200° C. is 4.15 J/g/K. The mixture of $H_2$ and C produced therefrom has an average specific heat capacity in the range from 100° C. to 1200° C. of 5.02 J/g/K. This ratio of the heat capacities fixes the maximum achievable efficiency of heat integration.

It was therefore an object of the present invention to provide a route for the parallel preparation of hydrogen, carbon monoxide and/or a solid carbon-comprising product with a small $CO_2$ footprint under economically attractive boundary conditions for the chemical industry.

A further object was to discover suitable process conditions which allow the reverse water gas shift reaction to be carried out economically and in a technically attractive manner at high temperatures.

A further object was to provide a process for synthesis gas production which can not only produce a fixed hydrogen to carbon monoxide ratio but also enables the hydrogen to carbon monoxide ratio to be set as required.

A further object was to provide a process for the thermal decomposition of hydrocarbons into carbon and hydrogen and conversion of the hydrogen into synthesis gas by means of carbon dioxide, which process has virtually complete heat integration, i.e. a higher efficiency than the individual reaction of the thermal decomposition of hydrocarbons to carbon and hydrogen.

The coupling of the RWGS reaction with a high-temperature process whose excess heat is utilized as driving force for the RWGS reaction appears to be advantageous. The desired heat integration makes it possible to create a scenario in which the heat flow from the high-temperature process is utilized to operate the RWGS reaction at a high temperature level.

BRIEF SUMMARY OF THE INVENTION

The object has been achieved by a process in which one or more hydrocarbons are thermally decomposed and at least part of the hydrogen-comprising gas mixture formed is taken off from the reaction zone of the decomposition reactor at a temperature of from 800 to 1400° C. and reacted with carbon dioxide to form a gas mixture comprising carbon monoxide and hydrogen (synthesis gas).

BRIEF DESCRIPTION OF THE SEVERAL VIEWS OF THE DRAWINGS

FIG. 4 illustrates compositions of the carbon monoxide- and hydrogen-comprising gas mixture;

DETAILED DESCRIPTION OF THE INVENTION

Figure 1:
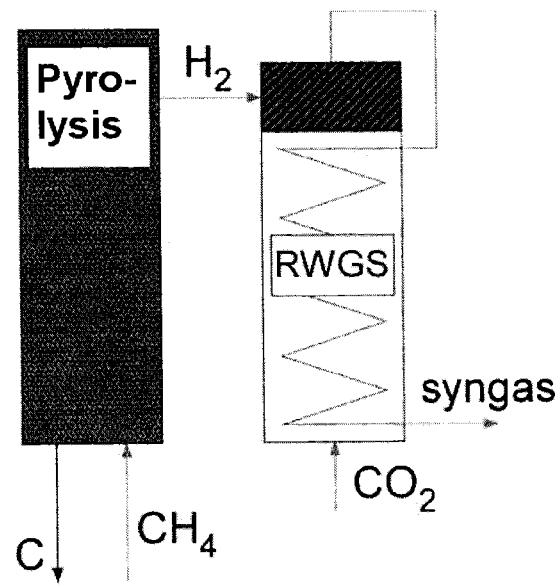
FIG. 1 illustrates an embodiment of the present disclosure in which all of the hydrogen-comprising gas mixture is taken of from the reaction zone of the pyrolysis.

The hydrogen-comprising gas mixture advantageously comprises more than 50% by volume of hydrogen, preferably more than 60% by volume of hydrogen, particularly preferably more than 70% by volume, very particularly preferably more than 80% by volume (corresponding to about 67% methane conversion), further preferably more than 90% by volume (corresponding to about 80% methane conversion), in particular more than 95% by volume (corresponding to about 90% methane conversion). Correspondingly, the hydrogen-comprising gas mixture comprises a maximum of 20% by volume of methane, carbon monoxide, carbon dioxide and nitrogen, and also further gases known to the person skilled in the art in this context, preferably a maximum of 10% by volume, particularly preferably a maximum of 5% by volume.

Advantageously, the hydrogen-comprising gas mixture comprises 50 to 100% by volume of hydrogen, preferably 85 to 100% by volume, in particular 95 to 100% by volume. The proportion of methane, carbon monoxide, carbon dioxide and nitrogen is advantageously 50 to 0% by volume, preferably 15 to 0% by volume, in particular 5 to 0% by volume. Advantageously, the proportion of carbon dioxide is less than 1% by volume, preferably less than 0.1% by volume.

Advantageously, the proportion of carbon monoxide is less than 5% by volume, preferably less than 1% by volume. Advantageously, the proportion of methane is less than 30% by volume, preferably less than 5% by volume. Advantageously, the proportion of nitrogen is less than 20% by volume, preferably less than 6% by volume.

The carbon monoxide- and hydrogen-comprising gas mixture advantageously comprises (i) 20-70 mol % of hydrogen, preferably 30 to 60 mol %, in particular 35 to 55 mol %, in particular 35 to 45 mol %; (ii) advantageously 5 to 60 mol % of carbon monoxide, preferably 7.5 to 35 mol %, in particular 15 to 30 mol %; (iii) advantageously 0 to 25 mol % of carbon dioxide, preferably 5 to 20 mol %, especially 8 to 20 mol %; (iv) advantageously 15 to 35 mol % of water, preferably 20 to 30 mol %; (v) advantageously 0 to 15 mol % of methane, preferably 0 to 10 mol %, in particular 0 to 5 mol %.

The hydrocarbons are advantageously fed in the form of a hydrocarbon-comprising gas to the decomposition reactor. Use is advantageously made of methane, ethane, propane ad/or butane. Preference is given to using natural gas as hydrocarbon-comprising gas; the molar fraction of methane in the natural gas is typically in the range from 75 to 99%, depending on the natural gas source.

The hydrocarbons are advantageously fed into the decomposition reactor at a temperature of 0 to 100° C., preferably 10 to 50° C. The hydrocarbons are advantageously fed into the decomposition reactor at a pressure of 1 to 50 bar, preferably 2 to 40 bar, in particular 5 to 30 bar. The hydrocarbons are advantageously fed into the decomposition reactor with a throughput of 100 to 200000 standard m$^3$/h, preferably of 1000 to 100000 standard m$^3$/h, in particular 7000 to 70000 standard m$^3$/h.

The thermal decomposition reaction (pyrolysis) is advantageously carried out at temperatures in the reaction zone of on average greater than 500° C., on average preferably greater than 800° C., particularly preferably greater than 1000° C., very particularly preferably greater than 1100° C., in particular greater than 1200° C. For example, the temperature in the decomposition reaction is in a range from 800 to 2500° C., preferably in a range from 1000 to 1800° C., further preferably in a range from 1100 to 1600° C., in particular in a range from 1200 to 1400° C.

The thermal energy required for carrying out the process of the invention can be provided, for example, via oxidative energy sources, e.g. the combustion of natural gas, solar energy sources, e.g. high-temperature solar power stations, and/or electric energy sources (International Journal of Hydrogen Energy 35 (2010) 1160-1190). The energy input can be effected by means of all methods known to those skilled in the art. To provide thermal energy for treatment of the process streams via electric power, various routes can be taken. Examples which may be mentioned here are inductive or resistive processes, plasma processes, heating by means of electrically conductive heating elements/contact areas or by means of microwaves.

The thermal decomposition reaction is advantageously carried out at a pressure of from atmospheric pressure to 70 bar, preferably 2 to 60 bar, particularly preferably 3 to 50 bar, very particularly preferably 5 to 40 bar, in particular 7 to 30 bar.

The reaction is thermodynamically favored at low pressure. At atmospheric pressure, the equilibrium temperature for 99% conversion is 875° C., while at 10 bar the corresponding value is above 1900° C.

Kinetically and from a process engineering point of view, relatively high pressures are advantageous. Increasing pressure accelerates the decarbonation reaction. In addition, a high pressure in the pyrolysis stage is compatible both with preceding stages and downstream stages: the pressure in the natural gas lines is usually 50 bar. The uses of the hydrogen produced or of the synthesis gas are high-pressure processes, for example the synthesis of ammonia (>100 bar), the synthesis of methanol (>50 bar) or the storage of hydrogen under pressure (about 700 bar).

The residence time in the reaction zone in the thermal decomposition reaction according to the invention is advantageously from 0.5 to 25 minutes, preferably from 1 to 60 seconds, in particular from 1 to 30 seconds.

The decomposition reaction according to the invention is advantageously carried out continuously or quasi-continuously.

The thermal decomposition of hydrocarbons is advantageously carried out in a fluidized-bed reactor.

The reaction space of the thermal decomposition reaction advantageously has a cylindrical cross section and its complete volume is accessible both to the solid and gaseous reaction streams and also to possible gaseous heat transfer media. The term reaction space also comprises, in addition to the reaction zones in the reactor which are used for heating and cooling, optionally also other elements such as feed lines, quench, etc.

The thermal decomposition reaction is advantageously carried out in the presence of a support, e.g. of an inorganic support (for example corundum ($Al_2O_3$), quartz glass ($SiO_2$), mullite ($Al_2O_3.SiO_2$), cordierite (($Mg, Fe_{2+})_2(Al_2Si$) [$Al_2Si_4O_{18}$]), steatite ($SiO_2.MgO.Al_2O_3$)), or of a carbon-comprising granular material. The support, preferably the carbon-comprising granular material, is preferably conveyed as moving bed through the reaction space, with the hydrocarbons to be decomposed advantageously being conveyed in countercurrent to the support, preferably a carbon-comprising granular material. For this purpose, the reaction space is advantageously configured as a vertical shaft so that movement of the moving bed occurs under the action of gravity alone. Flow can advantageously occur homogeneously and uniformly through the moving bed.

For the purposes of the present invention, a carbon-comprising granular material is a material which advantageously consists of solid particles which comprise at least 50% by weight, preferably at least 80% by weight, in particular at least 90% by weight, of carbon. The carbon-comprising granular material advantageously has a particle size, i.e. an equivalent diameter which can be determined by sieving using a particular mesh size, of from 0.5 to 100 mm, preferably from 1 to 80 mm. The particles of the carbon-comprising granular materials are advantageously spherical. In the process of the invention, it is possible to use many different carbon-comprising granular materials. Such a granular material can, for example, consist of coal, coke, broken coke and/or mixtures thereof. Broken coke generally has a particle size of less than 20 mm. Furthermore, the carbon-comprising granular material can comprise from 0 to 15% by weight, based on the total mass of the granular material, preferably from 0 to 5% by weight, of metal, metal oxide and/or ceramic. Particular preference is given to using granular materials which comprise broken coke and/or low-value coke, i.e. coke which is not directly suitable for the smelting process, coking works coke based on brown coal or hard coal and/or coke derived from biomass.

The heat capacity flows of the media which exchange heat with one another are advantageously as close as possible to one another. The mass flow of the support fed in, preferably the carbon-comprising granular material, is advantageously from 1 to 3 times, preferably from 1.7 to 2.5 times, the mass flow of the hydrocarbon fed in (without taking into account inert gases).

If all of the hydrogen-comprising gas mixture is taken off from the reaction zone of the pyrolysis (FIG. 1), the upper heat transfer zone in the pyrolysis reactor, the solids recirculation and any solids input can advantageously be saved. This considerably simplifies the configuration in terms of apparatus and the operation of the pyrolysis reactor. Taking off all of the hydrogen from the reaction zone of the pyrolysis is particularly advantageous when synthesis gas is to be produced as sole fluid product. In this case, a support, e.g. an inorganic support or a carbon-comprising granular material is advantageously initially placed as initial charge in the pyrolysis reactor. The upper section of the pyrolysis reactor is advantageously heated to the required pyrolysis temperature. Methane is advantageously introduced from below at ambient temperature into the pyrolysis reactor, preferably at temperatures of less than 600° C., in particular less than 400° C., further preferably less than 250° C., further preferably less than 100° C., in particular in the range from 0 to 50° C. At the lower end of the reactor, a solids stream which in steady-state operation corresponds to the amount of carbon-comprising product produced is discharged. As a result of this mode of operation, the solid in the pyrolysis reactor is continuously replaced. Heat integration is realized by the countercurrent transport of the gas stream and the solids stream in the lower section of the pyrolysis reactor. The mass flow ratio of the gaseous feed stream and the solid product stream is advantageously in the range from 0.65 to 3, preferably from 1.0 to 2.0, particularly preferably between 1.2 and 1.5. The solid with which the pyrolysis reactor is packed advantageously forms a moving bed under operating conditions. In the region of the heat transfer zone, a moving bed which advantageously exhibits downward laminar flow with little axial dispersion is advantageously formed. In the region of the reaction zone, a moving bed or a fluidized bed can advantageously be formed. The fluidized bed in the reaction zone has advantageous heat transfer properties for the introduction of heat and for establishment of a uniform temperature field.

If all of the hydrogen-comprising gas mixture is taken off from the reaction zone of the pyrolysis, this is advantageously taken off hot at the upper end of the pyrolysis reactor. The temperature of the stream taken off advantageously corresponds to the reaction temperature of the pyrolysis (from 800° C. to 2500° C., preferably in a range from 1000° C. to 1800° C., more preferably in a range from 1100° C. to 1600° C., in particular in a range from 1200° C. to 1400° C.).

If only part of the hydrogen-comprising gas mixture produced during the thermal decomposition reaction is taken off, the support, preferably the carbon-comprising granular material is advantageously conveyed as moving bed through the reaction space. In a particularly preferred variant of the process of the invention, the support, preferably the granular material is introduced at ambient temperature, preferably at temperatures of less than 600° C., in particular less than 400° C., more preferably less than 250° C., more preferably less than 100° C., in particular in the range from 0 to 50° C., into the reaction space, there firstly heated up to a maximum temperature and subsequently cooled again, with the maximum temperature occurring in a high-temperature zone, viz. the reaction zone, in which temperatures of on average greater than 800° C., preferably greater than 1000° C., more preferably greater than 1100° C., in particular greater than 1200° C., prevail. For example, the temperature of the decomposition reaction is in a range from 800 to 2500° C., preferably in a range from 1000 to 1800° C., more preferably in a range from 1100 to 1600° C., in particular in a range from 1200 to 1400° C. For the purposes of the present invention, the term reaction zone refers to that region in the reactor in which the endothermicity, i.e. the heat requirement of the reaction, advantageously exceeds 10 kW/m$^3$, preferably 100 kW/m$^3$, in particular 500 kW/m$^3$. This corresponds approximately to the region in the reactor which has a temperature of greater than 500° C.

Cooling can be carried out down to the vicinity of ambient temperature, so that cooling or quenching of the support, preferably carbon-comprising granular material, taken off from the reaction space is not necessary. To form and maintain the temperature profile described, it is proposed that at least the support, preferably the hydrocarbon-comprising gas be introduced at ambient temperature into the reaction space and be conveyed in countercurrent through the moving bed. On its way through the reaction space, the support, preferably the hydrocarbon-comprising gas exchanges heat in direct contact with the moving bed, with the hydrocarbon-comprising gas being heated to above 1000° C., preferably to above 1100° C., in particular to above 1200° C., and the moving bed simultaneously being cooled. Hot hydrogen-comprising gas mixture formed in the high-temperature zone is at least partly taken off at temperatures of from 800 to 1400° C. and the remainder is conveyed further in countercurrent through the moving bed and cooled in direct heat exchange with the latter, so that hydrogen having a temperature in the vicinity of ambient temperature can be taken off from the reaction space.

Thermal energy required for hydrogen production is, in particular, generated in the high-temperature zone and/or introduced into the high-temperature zone. However, the production and/or introduction of thermal energy at other places in the reaction space should not be ruled out.

In the reaction zone, a sufficiently high temperature level in order to achieve a conversion in the thermal decomposition of the hydrocarbons of greater than 80%, preferably greater than 90%, in particular complete conversion, is advantageously established. Furthermore, the conversion in the thermal decomposition can be controlled via the residence time. For example, a gas residence time of 2 seconds at 1200° C. and ambient pressure gives a relative methane conversion of about 67%, a residence time of 3 seconds gives a methane conversion of about 80% and a residence time of 4.5 seconds gives a methane conversion of about 90%. The residence time is defined as the ratio of the empty volume of the reaction zone to the volume flow of the gas stream at the inlet into the reaction zone.

The carbon formed by the decomposition reaction according to the invention is advantageously deposited to an extent of at least 90% by weight, based on the total mass of the carbon formed, preferably at least 95% by weight, on the support, advantageously on the carbon-comprising granular material.

For the purposes of the present invention, a carbon-comprising product is a product which advantageously comprises at least 90% by weight, preferably at least 95% by weight, particularly preferably at least 98% by weight, in particular at least 99% by weight, of carbon. The carbon-comprising product advantageously comprises less than 5% by weight, preferably less than 1% by weight, particularly preferably less than 0.1% by weight, based on the total mass of the carbon-comprising product, of ash. The carbon-comprising product advantageously comprises less than 5% by weight, preferably less than 1% by weight, particularly preferably less than 0.1% by weight, based on the total mass of the carbon-comprising product, of alkalis, in particular oxides and hydroxides of the alkali metals and alkaline earth metals, sulfur- and/or phosphorus-comprising compounds. These carbon-comprising products can be used, for example, in steelmaking as direct-firing coal, as coke carbon additive or as blast furnace coke.

Advantageously, at least 5% by weight, based on the original total mass of the granular material, of carbon, preferably at least 10% by weight, particularly preferably at least 20% by weight, in particular at least 30% by weight, of carbon are deposited on the carbon-comprising granular material used by means of the process of the invention. The mass of the carbon-comprising granular material used can advantageously be increased by from 10% by weight to 80% by weight, based on the original total mass of the granular material, preferably by from 20% by weight to 50% by weight, particularly preferably by from 25 to 40% by weight, by the process of the invention.

In the process of the invention, the $CO_2$ emission for 100 kg of hydrogen is advantageously less than 10 kg of $CO_2$/kg of $H_2$, preferably less than 8 kg of $CO_2$/kg of $H_2$, in particular less than 6 kg of $CO_2$/kg of $H_2$.

The thermal decomposition reaction can be carried out, for example, as described in the international patent application WO 2013/004398 (P11C078 PCT/EP2012/002877) or as described in the literature cited there.

A heat-integrated mode of operation is achieved by means of the countercurrent transport of the gas and the stream of solids.

The recirculation of heat from the thermal decomposition reaction is advantageously such that the average temperature of the product streams with the exception of the hydrogen-comprising gas mixture taken off from the reaction zone, i.e. hydrogen and carbon-comprising product, is not more than 50-100K above, preferably not more than 25-50K above, in particular not more than 5-20K above, the average entry temperature of the feed stream or of the carbon-comprising granular material.

This degree of heat integration is achieved, according to the invention, by a substream of the hydrogen-rich gas stream being taken off directly from the reaction zone at temperatures of from 800 to 1400° C.

The efficiency of the heat integration ($\eta 1$=(temperature of the reaction zone–gas outlet temperature of the main stream)/(temperature of the reaction zone–solids inlet temperature) is advantageously greater than 50%, preferably greater that 75%, more preferably greater than 90%, in particular greater than 95%.

At least part of the hydrogen-comprising gas mixture produced, preferably from 10 to 40% (based on the ratio of side offtake stream/main stream of hydrogen), particularly preferably from 15 to 35%, very particularly preferably from 18 to 30%, in particular from 20 to 25%, is advantageously taken off from the reaction zone.

As an alternative, all of the hot hydrogen produced in the thermal decomposition process is taken off.

Figure 2:
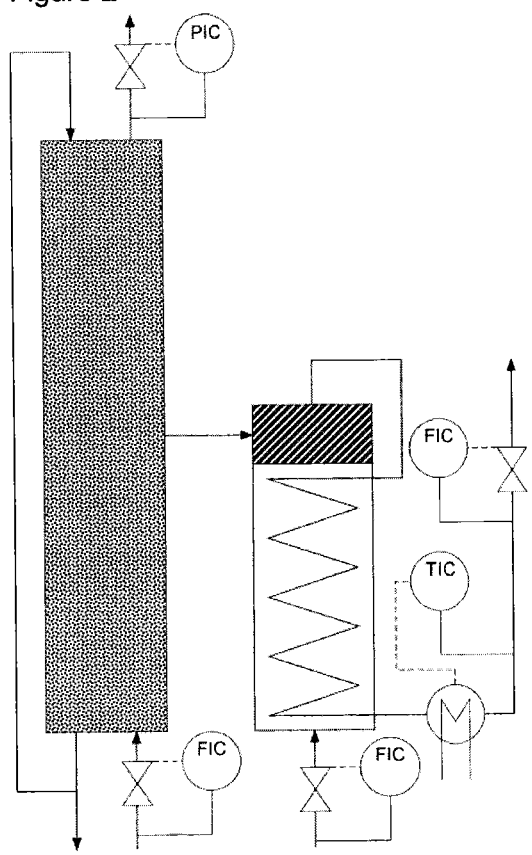
FIG. 2 illustrates a flow diagram of flow regulation for an embodiment of the present disclosure including a side offtake.

The offtake of gas can be carried out by all methods known to those skilled in the art (devices for the offtake of gas above a fluidized bed are described, for example, in Ullmann chapter "Fluidized-Bed Reactors"). The offtake can be realized, for example, by means of a heat-resistant connecting line between the pyrolysis reactor and the RWGS reactor (Nieken: Abluftreinigung in Reaktoren mit periodischer Strömungsumkehr. VDI series 3, No. 328, VDI-Verlag 1993). FIG. 2 shows by way of example the flow diagram of flow regulation for the side offtake. The regulating valves are advantageously installed in the cold feed and discharge lines of the pyrolysis reactor and the RWGS reactor.

The temperature of the hydrogen-comprising gas mixture taken off is advantageously from 500 to 2500° C., preferably from 800 to 2000° C., further preferably from 1000 to 1800° C., further preferably from 1100 to 1600° C., more particularly preferably from 1200 to 1400° C.

The regulated addition of an oxygen-comprising gas, for example air, but preferably oxygen of technical grade purity (advantageously greater than 95% by volume oxygen, preferably greater than 99% oxygen, particularly preferably greater than 99.5% oxygen), to the side offtake stream advantageously enables the temperature of the side off-take stream (hydrogen-comprising gas mixture) to be set to a desired value of, for example, 800 to 2000° C., preferably 1000 to 1800° C., particularly preferably 1100 to 1600° C., in particular 1200 to 1400° C., i.e. the desired temperature in the RWGS reactor serves as guide variable for the oxygen metering. This hydrogen-comprising gas mixture which has been taken off is advantageously introduced into the reaction zone of the RWGS stage and thus serves simultaneously as starting material and as heat transfer medium for supplying the RWGS reaction. For example, an atomic ratio, i.e. hydrogen to oxygen, of 10:1 to 100:1, preferably 20:1 to 80:1, particularly preferably 25:1 to 60:1, in particular 30:1 to 50:1, is used; compared to operation without addition of oxygen, this corresponds to an adiabatic temperature increase at the exit from the reaction zone of the reverse water-gas shift reaction preferably of 15 K to 350 K, preferably of 20 K to 200 K, particularly preferably of 25 K to 170 K, very particularly preferably of 30 K to 60 K (the figures correspond to the ranges of the H2:O2 ratio under the following boundary conditions: molar feed composition: H2:CO2:CH4=2:1:0.2, feed temperature: 900° C., pressure: 10 bar).

The addition of oxygen is particularly advantageous if the hydrogen-comprising gas mixture also comprises methane at greater than 5% by volume. Methane is partially oxidized to CO+H2 by the addition of O2 at a temperature of >800° C. to a substantial degree, by equilibrium conversion advantageously between 45 and 99.8%, preferably between 55 and 70%.

Advantageously, a molar ratio of (residual) methane to oxygen in the hydrogen-comprising gas mixture of the side offtake of 0 to 10, preferably 0.1 to 5, particularly preferably of 0.3 to 3 in particular of 0.5 to 2 is selected.

In an advantageous embodiment, for this RWGS, a reactor comprising
(1) a gas-free space in the upper section into which carbon dioxide, the hydrogen-comprising gas mixture (including residual methane) and oxygen are introduced together or separately, mix and pre-react (2) a catalyst bed beneath, where RWGS and reforming reactions are equilibrated, is used.

Alternatively, the oxygen stream can be added to the pyrolysis directly into the hydrogen-comprising gas mixture in the side offtake line and a portion of the hydrogen can be combusted. In particular embodiments of the invention, the hydrogen-comprising gas mixture can be purified. This purification is, in particular, useful when the hydrogen-comprising gas mixture comprises large amounts of carbon-comprising dusts or aerosols which could be problematical in the downstream process stages. Purification of such dusts or aerosols can be effected by means of suitable measures. Such measures can be, inter alia: utilization of a cyclone for solids precipitation, utilization of electrostatic filters for solids precipitation, utilization of macroscopic solid bodies for solids precipitation, use of filter media for solids precipitation and further methods known to those skilled in the art. The purification processes described can be performed in a wide temperature range, advantageously in the range from 0 to 1400° C., preferably from 500° C. to 1400° C., particularly preferably from 800° C. to 1400° C.

The side offtake stream is advantageously fed directly into the reaction chamber of a reverse water gas shift reaction.

The hydrogen-comprising gas taken off from the thermal decomposition reaction is advantageously reacted with carbon dioxide to form synthesis gas in a reverse water gas shift reaction. The unreacted methane comprised in the hydrogen-comprising gas is advantageously reformed simultaneously with the reverse water gas shift reaction with carbon dioxide and the water released in the RWGS reaction. The catalyst for the RWGS reaction advantageously likewise catalyzes the reforming of methane. As a result of the reforming of methane, the yield of carbon monoxide is advantageously increased and the hydrogen consumption for the reverse water gas shift reaction is at least partly compensated. At the same time, the residual concentration of methane in the synthesis gas is reduced.

The hydrogen required for the reverse water gas shift reaction is advantageously provided to an extent of more than 80% (in relation to the overall hydrogen requirement), preferably more than 90%, by the side offtake stream, viz. the hydrogen-comprising gas mixture, from the reaction zone of the thermal decomposition reaction; in particular, the hydrogen required is provided exclusively by the side offtake stream, viz. the hydrogen-comprising gas mixture, from the reaction zone of the thermal decomposition reaction.

The volume flow ratio between the carbon dioxide and the hydrogen-comprising gas mixture advantageously varies in the range from 0.1 to 5, preferably from 0.2 to 4, particularly preferably from 0.25 to 3, in particular from 0.3 to 2.

If a molar ratio of hydrogen to carbon monoxide in the synthesis gas of 2:1 is desired, the molar ratio of carbon dioxide to hydrogen in the hydrogen-comprising gas mixture is advantageously set to approximately 1:2 to 1:2.5; if a molar ratio of hydrogen to carbon monoxide in the synthesis gas of 1:1 is desired, the molar ratio of carbon dioxide to hydrogen in the hydrogen-comprising gas mixture is advantageously set to approximately 1:1 to 1:1.5. This ratio remains stable over a wide range of the conversion of the thermal decomposition reaction. The setting of the desired hydrogen to carbon monoxide ratio can be carried out by all methods known to those skilled in the art (see FIGS. 3 and 4).

Figure 3A:
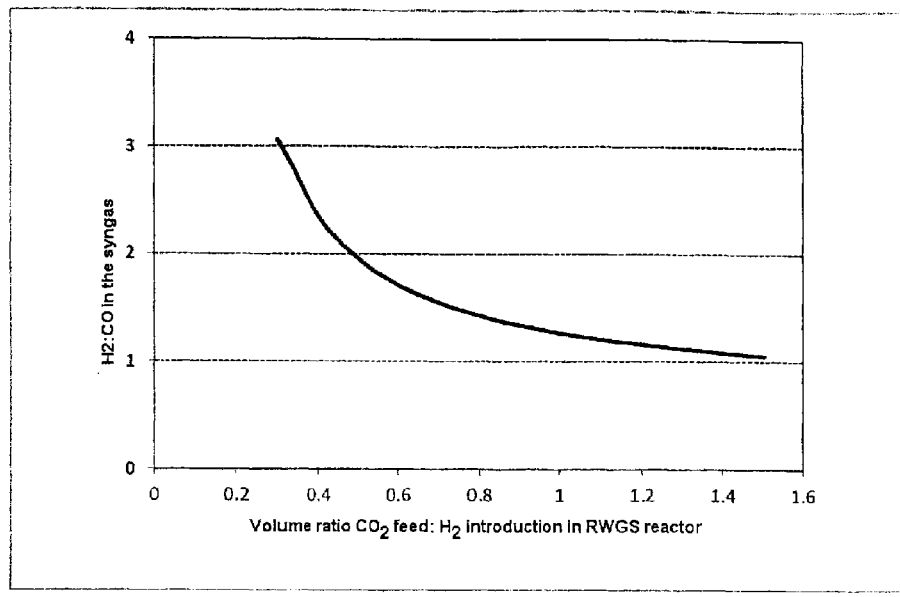
FIG. 3A depicts a graph of $H_2$:CO in the syn gas versus volume ratio $CO_2$ feed:$H_2$ introduction in RWGS reactor.
Figure 3B:
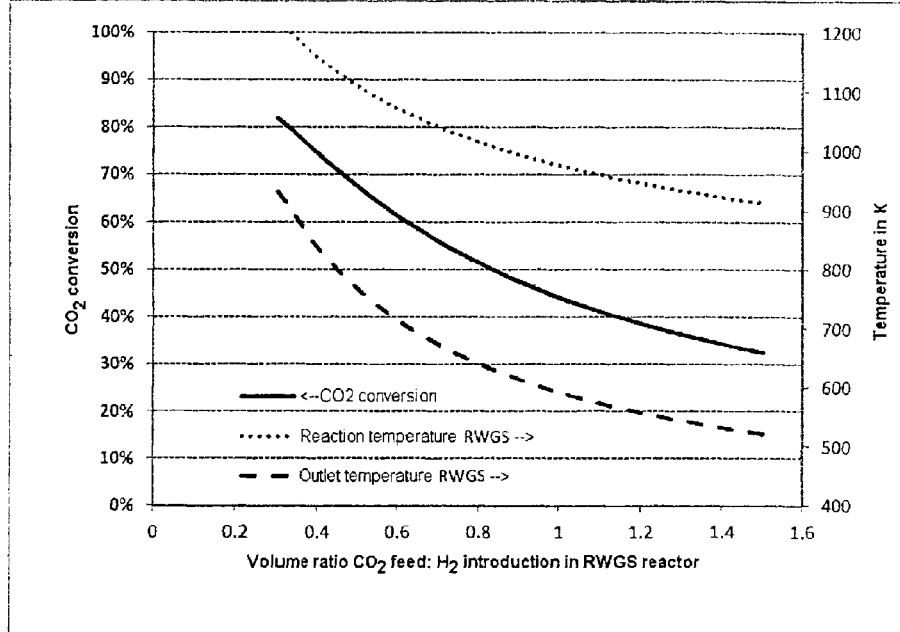
FIG. 3B depicts graphs of $CO_2$ conversion versus volume ratio $CO_2$ feed:$H_2$ introduction in RWGS reactor.

FIGS. 3A and 3B is based on an RWGS stage with integrated heat recycling with the following assumptions: (i) offtake temperature from the pyrolysis 1200° C., (ii) pressure: $1 bar_{abs}$, (iii) adiabatic equilibrium stage for the RWGS reaction, (iv) heat exchange between the syngas and the fresh CO2 in an ideal countercurrent heat exchanger (equilibrium model). FIG. 3A shows the dependence of the $H_2$:CO ratio in the synthesis gas on the volume flow ratio $CO_2$:$H_2$. FIG. 3B shows the dependence on the $CO_2$ conversion, the exit temperature of the synthesis gas from the reaction zone and the exit temperature after the heat exchange in the RWGS stage. FIG. 4 illustrates the composition of the carbon monoxide- and hydrogen-comprising gas mixture, i.e. the RWGS product stream, as a function of the volume flow ratio $CO_2$:$H_2$, temperature and pressure.

Adjustment of the ratio of hydrogen to carbon monoxide in synthesis gas (product stream of the RWGS stage) can also be effected by adding hydrogen-comprising gas mixture to the product stream of the RWGS stage, for example an addition of 10% hydrogen-comprising gas mixture in relation to the product stream of the RWGS stage, i.e. the carbon monoxide- and hydrogen-comprising gas mixture, preferably 20%, in particular 50%, or by discharging a portion of the hydrogen, for example 10% in relation to the hydrogen content in the synthesis gas (product stream of the RWGS stage), preferably 20%, in particular 50%, from the RWGS product stream.

The combined reverse water gas shift reaction and reforming of methane are advantageously carried out at temperatures of from 500° C. to 1500° C., preferably from 700° C. to 1200° C., in particular from 800 to 1000° C.

The process heat required for the reverse water gas shift reaction and the reforming is advantageously introduced to an extent of at least 20% by the sensible heat of the hydrogen-comprising gas mixture fed in, preferably to an extent of at least 50%, particularly preferably to an extent of at least 80%, and in particular the process heat required for the reverse water gas shift reaction and the reforming is introduced in its entirety by the hydrogen-comprising gas mixture fed in.

The reactor for the reverse water gas shift reaction and the reforming of methane is advantageously likewise equipped with integrated heat recirculation. For this purpose the $CO_2$-comprising feed stream is advantageously introduced cold into the reactor and exchanges heat in countercurrent with the product stream from the RWGS reaction.

The reactor for the reverse water gas shift reaction and the reforming of methane is advantageously an adiabatic reactor. The reactor can comprise additional devices for heat generation and/or for introduction of heat.

The combined reverse water gas shift reaction and reforming of methane is advantageously carried out at a pressure of from 1 to 50 bar. The pressure of the reverse water gas shift reaction advantageously corresponds to the pressure of the thermal decomposition reaction; a possible pressure difference between the two reactions is advantageously less than 1 bar, preferably less than 100 mbar.

The residence time in the reaction zone in the combined reverse water gas shift reaction and reforming of methane according to the invention is advantageously in the range from 0.1 to 30 seconds.

The reverse water gas shift reaction according to the invention is advantageously carried out continuously or quasi-continuously.

A preferred embodiment of the RWGS reactor is a reactor having periodic flow switching and introduction of the hot hydrogen-comprising gas mixture in the middle (Kolios: Zur autothermen Führung der Styrolsynthese mit periodischem Wechsel der Strömungsrichtung. In VDI-Fortschrittsberichte, series 3, vol. 501. Düsseldorf: VDI-Verlag 1997.).

Figure 5A:
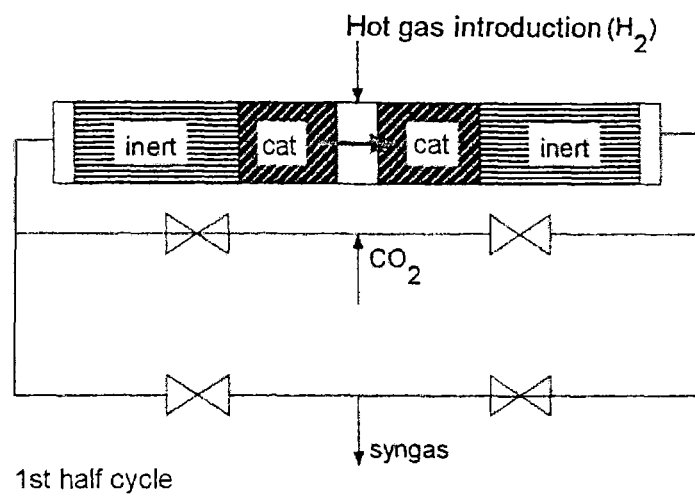
FIG. 5A illustrates a schematic diagram of an RWGS reactor of the present disclosure, during the first half cycle.
Figure 5B:
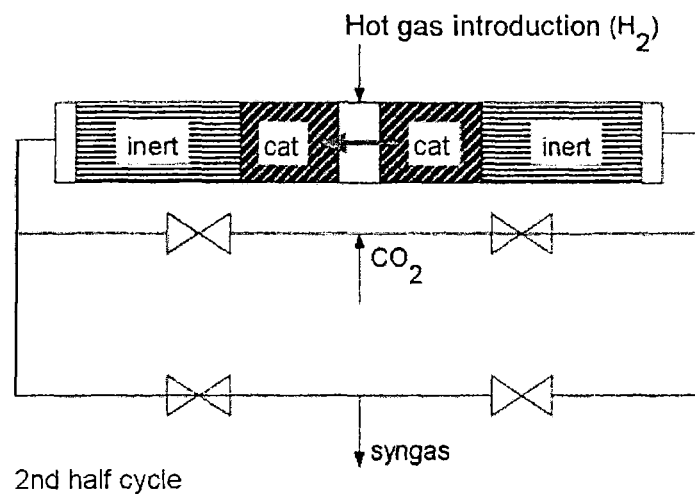
FIG. 5B illustrates a schematic diagram of an RWGS reactor of the present disclosure, during the second half cycle.

FIGS. 5A and 5B show in-principle sketches of the RWGS reactor. The reactor is configured as an adiabatic fixed-bed reactor having structured packing. The middle zone comprises the RWGS catalyst. The hydrogen-comprising gas mixture fed in can be fed into the catalytically active zone either centrally or distributed over the zone. The edge zones which serve as heat exchange zones for heat integration comprise an inert ceramic packing. Internals having a high specific surface area, for example honeycomb monoliths having a high cell count (>100 cpsi) or balls having a small diameter (<5 mm), enable efficient heat transfer for heat integration to be achieved. Advantageously, the inflow side for the supply of the $CO_2$-rich stream is switched at periodic time intervals between 10 sec and 30 min, preferably 30 sec and 10 min, more preferably 60 sec and 300 sec. The switching is advantageously effected by means of a valve or flap control, as known to the person skilled in the art from plants for regenerative thermal post-combustion of waste air streams.

The carbon dioxide advantageously has a temperature of from 500° C. to 1200° C., preferably from 700° C. to 1100° C., particularly preferably from 700° C. to 1000° C., on entering the reaction zone of the reverse water gas shift reaction.

In a further alternative embodiment, the reaction zone of the RWGS stage can be heated, for example in the manner of a reformer (Reimert et al.: Gas Production, 2. Process. In Ullmann's Encyclopedia of Industrial Chemsitry. Vol. 16, pp. 423-482, Verlag Wiley-VCH, 2012.). In this form of the configuration, the feedstreams (carbon dioxide and hydrogen-comprising gas mixture) and the product stream, viz. the synthesis gas, can be thermally decoupled from one another. The synthesis gas can, on leaving the reaction zone, be quenched in a quench in order to freeze the reaction equilibrium achieved at high temperature. The entry temperature of the carbon dioxide into the reaction zone is, in this embodiment, advantageously from 50 to 500° C., preferably from 200 to 500° C., in particular from 300 to 500° C.

The carbon dioxide conversion in the combined reverse water gas shift reaction and reforming of methane according to the invention is advantageously greater than 30%, in particular greater than 60%. The carbon dioxide conversion is advantageously in the range from 60 to 100%, in particular 75 to 100%.

The secondary reaction of methanation advantageously makes up less than 10%, preferably less than 3% based on the carbon dioxide used. In particular, the methane comprised in the hydrogen-comprising gas mixture is reformed by the carbon dioxide.

The secondary reaction of carbonization of the RWGS catalyst advantageously makes up less than 0.001% based on the total amount of carbon dioxide converted, preferably less than 0.0001% based on the total amount of carbon dioxide converted.

The efficiency of the heat integration of the coupled processes according to the invention of the thermal decomposition reaction of hydrocarbons and the combined reverse water gas shift reaction reforming of methane is advantageously greater than 84%, preferably greater than 88%, particularly preferably greater than 90%, in particular greater than 92%. The efficiency is defined as the ratio of the total heat of reaction taken up by the thermal decomposition and the RWGS reaction to the total quantity of heat supplied to the process.

The catalyst material for the RWGS catalyst advantageously satisfies a number of requirements in order to prove suitable for carrying out the process. Firstly, such a material should have a high sintering stability of the active metal in order to not suffer any decrease in activity due to premature aging at the high working temperatures. Secondly, the hydrothermal stability of the catalyst material should be sufficient to prevent premature structural collapse of the material, since one mole of water is produced per mole of converted carbon dioxide. Thirdly, the material should have a sufficient carbonization resistance in the presence of precursors of carbonaceous material, e.g. small olefins, aliphatics and aromatics, which can be present in the hot hydrogen from the pyrolysis stage. Fourthly, the material should, in particular for the preparation of CO-rich synthesis gas having a hydrogen to carbon monoxide ratio of less than 1.5, partly prevent CO disproportionation and the formation of carbonaceous material associated therewith, or be able to reconvert previously formed carbonaceous material by reaction of hydrogen in a methanation reaction or by reaction with carbon dioxide in a Boudouard reaction.

Catalysts according to the invention generally comprise suitable active metal and suitable support material. Suitable active metals can be, inter alia: platinum metals such as Rh, Pt, Ir, Pd or Ru. Among the platinum metals, particular preference is given to Pt or Ir. Suitable iron metals can, inter alia, be Ni, Co and Fe. Particular preference is here given to Ni or Co. A further active metal which is likewise preferred is copper. Combinations of the active metals mentioned are likewise possible. Such combinations of active metals can form alloys or intermetallic phases, particular metals can be present in metallic form, others can be present side-by-side in oxidic form or particular fractions of the metal components can be present side-by-side in metallic or oxidic form. Suitable elements for promoting the active metals, which can be present in oxidic or elemental form, can be, inter alia, alkali metals, alkaline earth metals, in particular Mg, Ca and Sr, lanthanides such as La and Ce, gallium, tin, zinc, vanadium, tungsten, niobium, tantalum, manganese or sulfur.

Suitable support materials for the abovementioned active metal components are, in particular, support materials which have a sufficiently high surface area and a sufficiently high interaction with the active metals and the promoters so as to allow high dispersion and aging stability. A high thermal conductivity of the material is likewise desirable in order to make good thermal coupling of the heat-carrying gas possible. Suitable support materials are, inter alia, oxidic support materials, in particular mixed metal oxides which consist of a plurality of metallic components in an oxidic matrix. Such mixed metal oxides can be present as single-phase oxides or as phase mixtures. Examples of suitable mixed metal oxides are, inter alia, spinels such as magnesium-aluminum spinel, fluorites such as cerium-zirconium fluorites, hexaaluminates or magnetoplumbites, perovskites, titanates, ferrites, solid solutions of zirconium oxides with lanthanides or complex aluminosilicates and other mixed metal oxides known to those skilled in the art. Other support materials which are likewise suitable for the purposes of the invention are, inter alia, carbides such as WC, MoC, BC or SiC, nitrides or borides.

The catalysts according to the invention likewise include classes of compounds in which the active metal is liberated from a suitable precursor form under activation or reaction conditions. Such compounds can be, inter alia, oxides, mixed oxides or carbonates.

The abovementioned catalysts according to the invention can be produced by methods known to those skilled in the art using precipitation reactions, impregnation processes, reactions of molten metals, salts or oxides or of metals, salts or oxides at high temperatures. Likewise included are treatment steps using oxidizing or reducing gas atmospheres at elevated temperatures and other measures known to those skilled in the art for increasing activity and stability.

The invention likewise provides for the use of a plurality of catalysts in a fixed bed of catalyst. Such a mode of operation can contribute to decreasing the proportion of expensive but high-temperature-resistant and carbonization-resistant noble metal. Such use can be as structured bed with stacked layers of various catalysts or as a mixture.

Other possible ways of using the catalyst are alternative operating variants such as use in a fluidized bed or use as coating material/wash-coat on metallic or ceramic monoliths or heat exchangers.

Separation of the synthesis gas from water produced, carbon dioxide and possibly methane can be carried out by all methods known to those skilled in the art (Gas Production 3. In Ullmann's Encyclopedia of Industrial Chemistry. Wiley-VCH, Weinheim, 2012).

In the synthesis gas process of the invention, the $CO_2$ emission is advantageously negative (decrease in $CO_2$), preferably less than $-50$ $kg_{CO2}/100$ $kg_{synthesis\ gas}$, in particular less than $-100$ $kg_{CO2}/100$ $kg_{synthesis\ gas}$.

For a plant having a hydrogen capacity of 100 kt/a (corresponding to a synthesis gas capacity of 700 kt/a at $H_2$:CO=2:1), there is a credit for the $CO_2$ saving of 14 million€/a. A certificate value of 20€/t$CO_2$ is assumed here.

Advantages of the novel process are firstly the provision of hydrogen or synthesis gas with a low $CO_2$ footprint. Secondly, the hydrogen to carbon monoxide ratio can be set in accordance with requirements in the process of the invention and also can be set in a wide range regardless of the conversion of the thermal decomposition reaction.

Savings in operating costs can be achieved by the coupled process of the invention due to the improved heat integration. Furthermore, capital costs can be saved by the simple configuration of the RWGS stage.

Furthermore, complete heat integration can be achieved in the pyrolysis stage by means of the coupled process of the invention. The heat losses can thus be halved compared to two separate processes. Methanization and carbonization in the reverse water gas shift reaction were able to be effectively prevented by the high reaction temperatures of this reaction.

Figure 6:
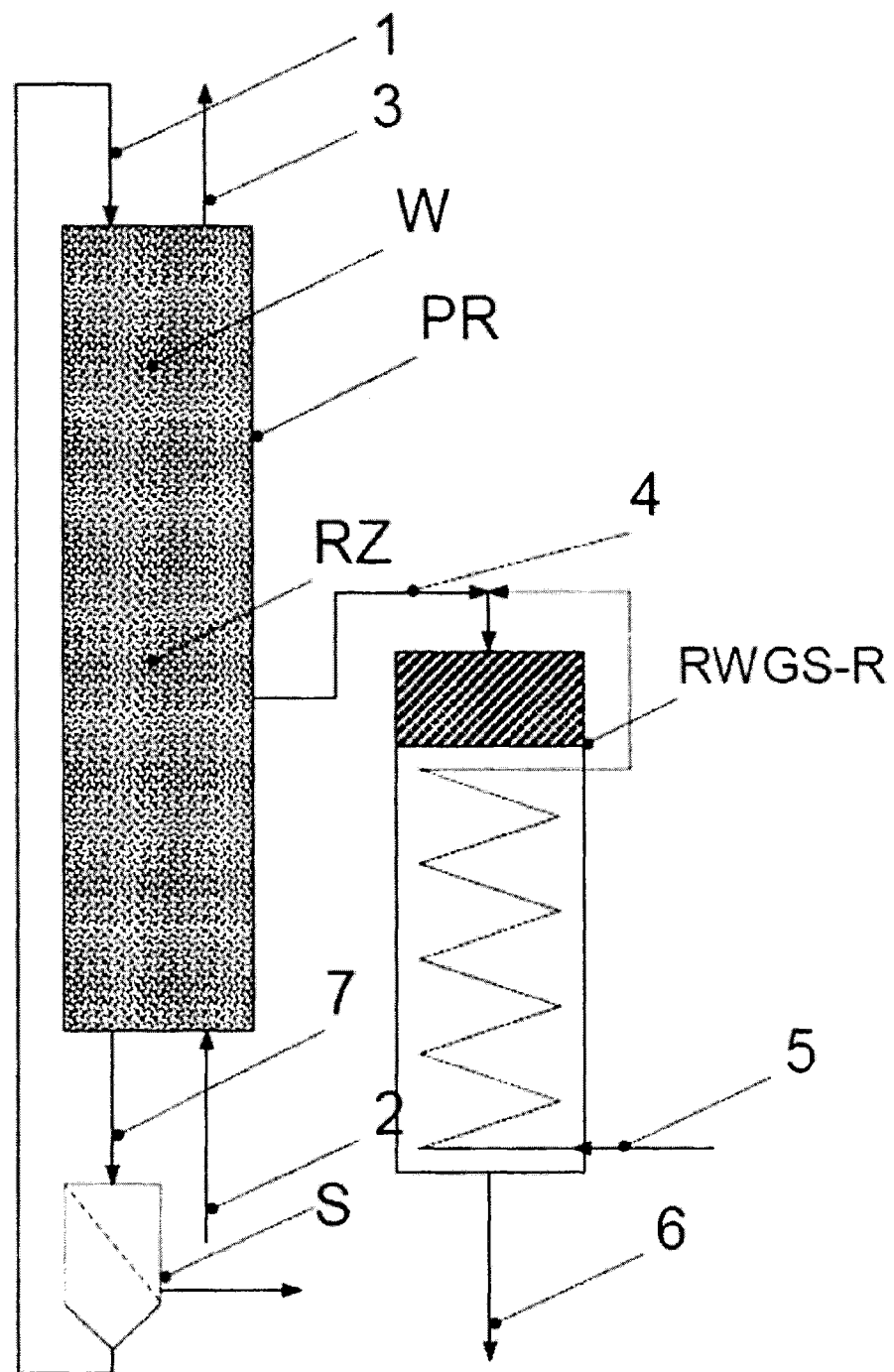
FIG. 6 illustrates one embodiment of a coupled process of the present disclosure.

FIG. 6 shows a variant of the coupled process according to the invention of thermal decomposition of hydrocarbons with the reverse water gas shift reaction, in which hydrogen, synthesis gas and a carbon-comprising product are obtained in parallel in a continuous process.

A carbon-comprising granular material, for example broken coke, at ambient temperature is introduced from above into the reaction space R via the feed conduit 1 and is subsequently conveyed downward in a moving bed W through the reaction space R under the action of gravity. A hydrocarbon-comprising gas 2, which is preferably natural gas, is simultaneously introduced from below into the pyrolysis reaction space PR and conveyed upward in countercurrent through the moving bed W. The gas 2, which is at ambient temperature on entering the reaction space PR, is heated on its way upward by direct heat exchange with the moving bed W to the decomposition temperature of the hydrocarbons which under these conditions decompose in an endothermic reaction into hydrogen and carbon. The carbon formed here advantageously deposits to an extent of more than 95% by weight on the carbon-comprising particles of the moving bed W, which improves the quality of these particles. Together with unreacted or only partly reacted hydrocarbons, the hot hydrogen formed continues to flow upward and is cooled by direct heat exchange with the moving bed W, so that a hydrogen-comprising gas mixture having a temperature which is not more than 25-50 K above ambient temperature can be taken off via line 3.

Part of the hot hydrogen-comprising gas mixture 4 is taken off from the reaction zone RZ of the pyrolysis reaction space PR and is fed directly to the reverse water gas shift reactor RWGS-R. The hot hydrogen 4 is reacted in the reverse water gas shift reactor RWGS-R with carbon dioxide 5 which is fed from the bottom into the reactor RWGS-R. The synthesis gas 6 formed is taken off from the top of the reactor RWGS-R. The heat of the synthesis gas stream 6 is used for heating the carbon dioxide stream 5.

At the lower end of the pyrolysis reaction space PR, granular material 7 at virtually ambient temperature is taken off and, owing to the carbon deposits, can be used, for example, as blast furnace coke or coking works additive. Constituents of the granular material 7 which do not meet the quality requirements because they have an excessively large (>80 mm) or excessively small diameter (<35 mm) or, for example, an unacceptably low strength (drum strength 140 for blast furnace coke >40% in accordance with ISO/FDIS 18894:2003) are separated off in the separation apparatus S by sieving and/or air classification and, after possible comminution, recirculated back to the pyrolysis reaction space PR.

The invention claimed is:

1. A process for the parallel preparation of hydrogen, carbon monoxide, and a carbon-comprising product, the process comprising:
    thermally decomposing one or more hydrocarbons in a reaction zone of a decomposition reactor in the presence of a support, to produce a hydrogen-comprising gas mixture and a carbon-comprising product, wherein the carbon-comprising product comprises at least 95% by weight of carbon and the carbon-comprising product formed by the decomposition reaction is deposited to an extent of at least 90% by weight, based on the total mass of the carbon formed, on the support;
    taking off at least part of the hydrogen-comprising gas mixture formed from the reaction zone of the decomposition reactor at a temperature of from 800° C. to 1400° C.; and
    reacting, by reverse water gas shift reaction, the hydrogen-comprising gas mixture taken off with carbon dioxide at a temperature of 800° C. to 1500° C. in a RWGS reactor, to form a synthesis gas mixture comprising carbon monoxide and hydrogen, wherein the process heat required for the reaction of hydrogen with carbon dioxide to form the synthesis gas mixture is introduced to an extent of at least 50% by the hydrogen-comprising gas mixture fed in, such that methanation makes up less than 10% based on the carbon dioxide used.

2. The process according to claim 1, wherein from 10 to 40% of the hydrogen-comprising gas mixture, based on the total hydrogen-comprising gas mixture formed in the thermal decomposition reaction, is taken off from the reaction zone of the decomposition reactor.

3. The process according to claim 1, wherein the process heat required for the reaction of hydrogen with carbon dioxide to form the synthesis gas mixture is introduced to an extent of at least 80% by the hydrogen-comprising gas mixture fed in.

4. The process according to claim 1, wherein the hydrogen-comprising gas mixture comprises more than 80% by volume of hydrogen.

5. The process according to claim 1, wherein the a ratio of the total heat of reaction taken up by the thermal decomposition and the RWGS reaction to the total quantity of heat supplied to the process, of the heat integration is greater than 84%.

6. The process according to claim 1, further comprising:
adding an oxygen-comprising gas to the hydrogen-comprising gas mixture taken off before the reaction with carbon dioxide, to provide an oxygen-hydrogen-comprising gas mixture.

7. The process according to claim 6, wherein the reaction of the hydrogen-comprising gas mixture with carbon dioxide takes place in a reactor which, above the catalyst bed, has a gas-free space into which the hydrogen-comprising gas mixture and the oxygen-comprising gas are introduced together or separately and mix to provide the oxygen-hydrogen-comprising gas mixture, which may pre-react.

8. The process according to claim 6, wherein the oxygen-comprising gas is added to the hydrogen-comprising gas mixture in a side offtake line between the decomposition reactor and the RWGS reactor, to provide the oxygen-hydrogen-comprising gas mixture.

9. The process according to claim 6, wherein the hydrogen-comprising mixture comprises methane, and
wherein a molar ratio of oxygen to methane in the oxygen-hydrogen-comprising gas mixture of the side offtake is from 0.1 to 5.

10. The process according to claim 6, wherein oxygen of technical grade purity is used as oxygen-comprising gas.

11. The process according to claim 1, wherein, for a target molar ratio in the synthesis gas of hydrogen to carbon monoxide of 2:1, the molar ratio of carbon dioxide to hydrogen in the hydrogen-comprising gas mixture is 1:2 to 1:2.5.

12. The process according to claim 1, wherein, for a target molar ratio in the synthesis gas of hydrogen to carbon monoxide of 1:1, the molar ratio of carbon dioxide to hydrogen in the hydrogen-comprising gas mixture is 1:1 to 1:1.5.

* * * * *